United States Patent
Park (10) Patent No.: US 7,257,982 B2
(45) Date of Patent: Aug. 21, 2007

(54) APPARATUS FOR FORMING A BEAM MEMBER USED AS A TORSION BEAM FOR THE REAR WHEEL SUSPENSION OF AN AUTOMOBILE

(75) Inventor: Byung-Cheol Park, Daegu (KR)

(73) Assignee: Hwashin Co., Ltd., Daegu (KR)

( * ) Notice: Subject to any disclaimer, the term of this patent is extended or adjusted under 35 U.S.C. 154(b) by 129 days.

(21) Appl. No.: 11/119,765

(22) Filed: May 3, 2005

(65) Prior Publication Data

US 2006/0059974 A1  Mar. 23, 2006

(30) Foreign Application Priority Data

Sep. 21, 2004 (KR) ............ 10-2004-0075605

(51) Int. Cl.
*B21D 53/88* (2006.01)
(52) U.S. Cl. .............. 72/398; 72/401; 72/370.23; 72/370.26; 29/897.2
(58) Field of Classification Search .......... 72/398, 72/369, 411, 401, 366, 370.04, 370.23, 370.24, 72/370.25, 370.26, 370.1; 29/897.2
See application file for complete search history.

(56) References Cited

U.S. PATENT DOCUMENTS

| | | | | |
|---|---|---|---|---|
| 3,507,142 A | * | 4/1970 | Coupland ............ | 72/415 |
| 4,095,450 A | * | 6/1978 | Opland et al. ......... | 72/318 |
| 4,135,380 A | * | 1/1979 | Olszewski et al. ...... | 72/306 |
| 4,827,590 A | * | 5/1989 | Metzger ............ | 29/890.035 |
| 5,353,618 A | * | 10/1994 | Roper et al. ......... | 72/58 |
| 5,749,135 A | * | 5/1998 | Crane et al. ......... | 29/415 |
| 5,884,722 A | * | 3/1999 | Durand et al. ........ | 180/312 |
| 6,070,445 A | * | 6/2000 | Holierhoek .......... | 72/61 |
| 6,119,501 A | | 9/2000 | Hansen et al. | |
| 6,263,720 B1 | * | 7/2001 | Valin ............... | 72/370.13 |

FOREIGN PATENT DOCUMENTS

KR     20-0278494    6/2002

* cited by examiner

*Primary Examiner*—Daniel C. Crane
(74) *Attorney, Agent, or Firm*—Birch, Stewart, Kolasch & Birch, LLP (57) ABSTRACT

An apparatus for forming a beam member for a torsion beam in a rear wheel suspension system of an automobile wherein said apparatus includes top and bottom dies for forming a U-shaped or V-shaped section and an extension section of the beam member, upper and lower pad-dies coupled to top and bottom dies for forming a rectangular section of the beam member before operation of the top and bottom dies, and left and right cams installed at both sides of a pipe so as to be horizontally inserted into the pipe by a hydraulic cylinder for maintaining inner shapes of the extension section and the rectangular section, said cams preventing both distortion and wrinkling from occurring on the rectangular section and the extension section of the beam upon operation of the top and bottom dies, thereby allowing the beam member to be formed to have different cross sections at different portions of the beam with complete symmetry, by a single process.

2 Claims, 9 Drawing Sheets

APPARATUS FOR FORMING A BEAM MEMBER USED AS A TORSION BEAM FOR THE REAR WHEEL SUSPENSION OF AN AUTOMOBILE

BACKGROUND OF THE INVENTION

1. Field of the Invention

The present invention relates to an apparatus for forming a beam member for a torsion beam in a rear wheel suspension system of an automobile.

2. Description of the Related Art

A torsion beam for a rear wheel suspension system of a vehicle comprises a beam member, and trailing arms at both sides of the beam member, and acts to maintain a stable posture of the vehicle through torsion of the beam member against centrifugal force exerted upon rotation of the vehicle. Accordingly, it is necessary for the torsion beam to have strong torsional rigidity and bending rigidity.

Initially, high torsional rigidity and bending rigidity torsion beams were produced in such a manner that, after a steel plate was bent into a beam member having a U-shaped or V-shaped cross section, a reinforcing torsion bar was provided parallel to the beam member inside the beam member, and then welded to the beam member with a reinforcing plate, followed by welding the trailing arms to both sides of the beam member.

However, although such a torsion beam may have sufficient torsion rigidity and bending rigidity via reinforcement of the torsion bar, the number of components for the torsion beam, such as a torsion bar and a reinforcing bar, is increased, and results in increasing the number of assembly processes and welding length, thereby remarkably reducing productivity of the torsion beam while increasing the frequency in producing defective products due to difficulties in the management of welding tolerances. Furthermore, the increased number of components also causes a reduction in fuel efficiency of the vehicle due to the increased weight of the vehicle.

In order to solve the problem of the prior art, a torsion beam, as disclosed in Korean Utility model No. 278494 issued to the applicant of the present invention, was suggested, which is produced by pressing a cylindrical pipe into a beam member having a central portion of a U-shaped or V-shaped two-fold cross section and both sides, each having a rectangular cross-section for securing stable welding to trailing arms, thereby providing sufficient torsional rigidity and bending rigidity required for the torsion beam of the rear wheel suspension system while enhancing the productivity caused by reduction in the number of components, the assembly process, and the length of welding. Furthermore, the torsion beam of Korean Utility model No. 278494 also provides the advantageous effect of reducing the frequency of defective products caused by management of the tolerance upon welding, and of enhancing fuel efficiency of the vehicle by reducing the weight of the vehicle.

However, when forming the beam member having different cross sections at different portions by pressing the pipe, as mentioned above, the number of processes for forming the beam member is not sufficiently reduced. Accordingly, in view of the fact that the increase in the number of processes causes not only reduction in productivity, but also increases manufacturing costs, thereby adversely affecting price competitiveness of the products, it is necessary to form a beam member with a minimum number of processes.

U.S. Pat. No. 6,119,501 discloses a method and device for forming a product having a U-shaped or V-shaped cross section by pressing a cylindrical pipe by use of a top die and two bottom dies having different shapes or by use of a top die and a bottom die comprising several parts movable with respect to one another.

A manufacturing process using two bottom dies comprises a preform forming process, which is performed in a state of The pipe fixedly held on a mandrel, and a secondary final forming process. In the manufacturing process using a bottom die comprising movable parts, the device comprises a shelf shaped top die, and a bottom die consisting of one middle part and two side parts, so that the beam member is formed by virtue of corporation of The top die and the bottom die in which the side parts move along slanted surfaces of the middle part.

It is considered that the method and device of U.S. Pat. No. 6,119,501 is useful for forming products with an entirely simple structure having a U-shaped or V-shaped cross section. However, when forming products having different cross sections at different portions of the product, like the beam member used for the torsion beam for The automotive rear suspension system, it is difficult to form a beam member having complete symmetry about the vertical axis of the beam member, since serious distortion or wrinkling of the pipe could occur at steep changes of the shape during deformation when external force is applied to the outer surface of the pipe through the dies.

As such, if complete symmetry between left and right sides of the beam member is not ensured, not only does deterioration of product quality occur due to non-uniform spring rigidity of the product, but misalignment also occurs between wheels and a vehicle frame due to displacement of the trailing arms welded to both sides of the beam member. Additionally, the torsion beam cannot ensure uniform torsion upon rotation of the vehicle, thereby causing a deterioration in not only the performance of a handle, but also durability of the torsion beam, which is caused by strong torsional eccentricity towards one side of the torsion beam. Accordingly, the method and device of U.S. Pat. No. 6,119,501 cannot be used for forming products having different cross sections at different portions of the product.

Accordingly, as with the beam member used for the torsion beam for the rear wheel suspension system of the automobile, when a product is formed to have different cross sections at different portions of the product in complete symmetry between left and right sides of the product without distortion or winkling, the product must be formed by progressive forming processes using several forming devices. Accordingly, not only do installation costs for the devices become very burdensome, but the productivity is also adversely affected due to an increase in the number of process steps, thereby increasing the manufacturing costs while adversely affecting price competitiveness of the products.

SUMMARY OF THE INVENTION

The present invention has been made to solve the above problems, and accordingly it is an object of the present invention to provide an apparatus for forming a beam member used for a torsion beam in a rear wheel suspension system of an automobile, which is designed to form the beam member having different cross sections at different portions of the beam member and complete symmetry between left and right sides of the beam member by providing a single process of pressing a cylindrical pipe without causing distortion or wrinkling of the final product.

In accordance with an aspect of the present invention, the above and other objects can be accomplished by the provision of an apparatus for forming a beam member used for a torsion beam in a rear wheel suspension system of an automobile, the apparatus comprising: top and bottom dies mounted to a die frame of the apparatus for forming a beam member to have a U-shaped or V-shaped section at a central portion of the beam member and to have an extension section, respectively, in terms of cross-section of the beam member; upper and lower pad-dies coupled to top and bottom dies, respectively, to be independently operated in the die frame by a hydraulic cylinder for forming a rectangular section of the beam member; and left and right cams installed at both sides of a pipe on a central line of the pipe to perform horizontal movement by means of a hydraulic cylinder for maintaining inner shapes of the extension section and the rectangular section of the beam member.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Preferred embodiments will now be described in detail with reference to the accompanying drawings.

Figure 1:
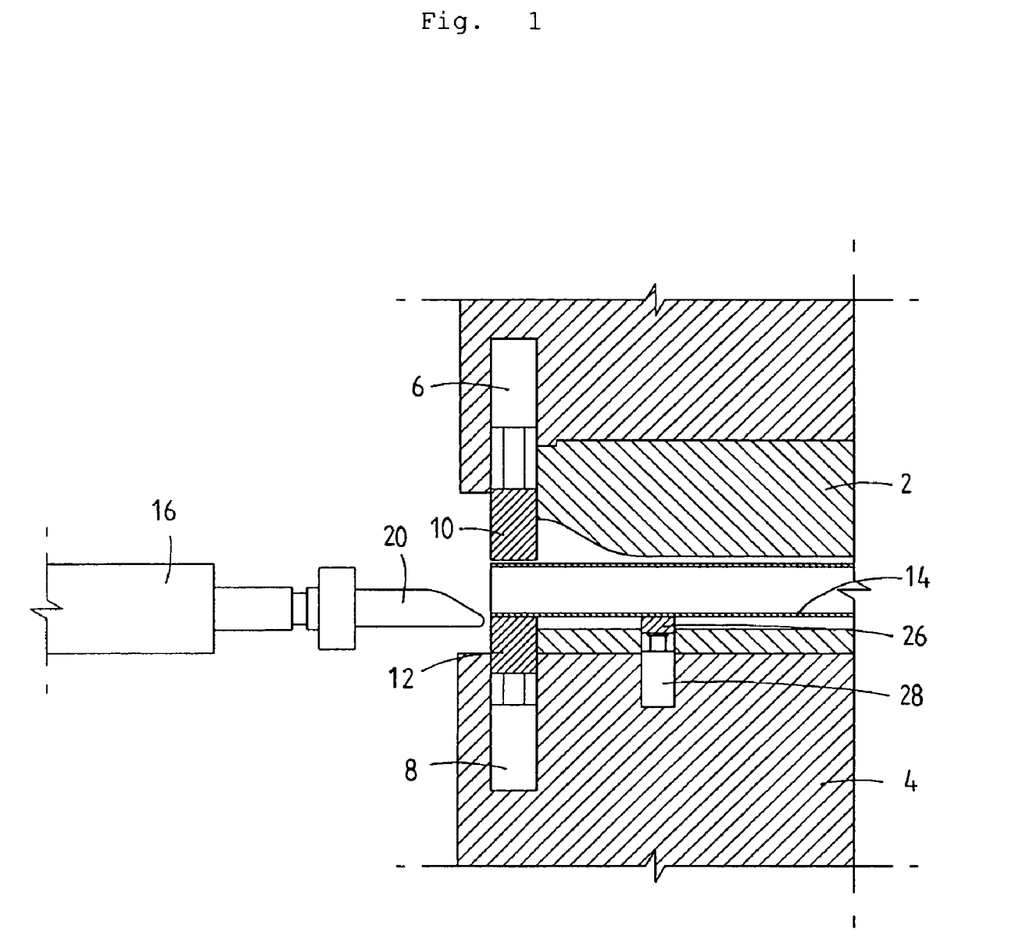
FIG. 1 is a partial transverse-sectional view illustrating an apparatus according to the present invention before the forming operation.
Figure 2:
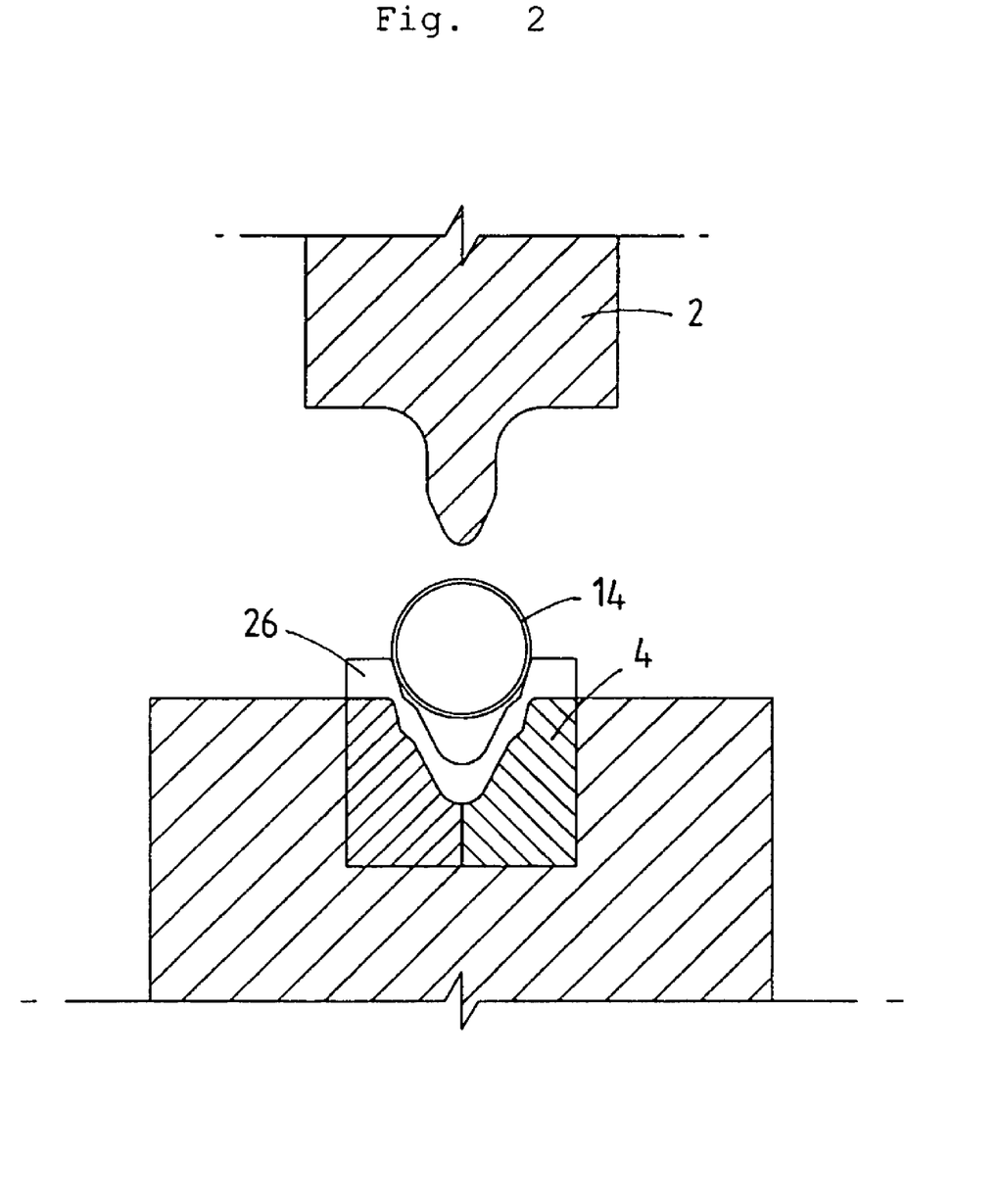
FIG. 2 is a partial cross-sectional view illustrating the apparatus according to the present invention before the forming operation.
Figure 3:
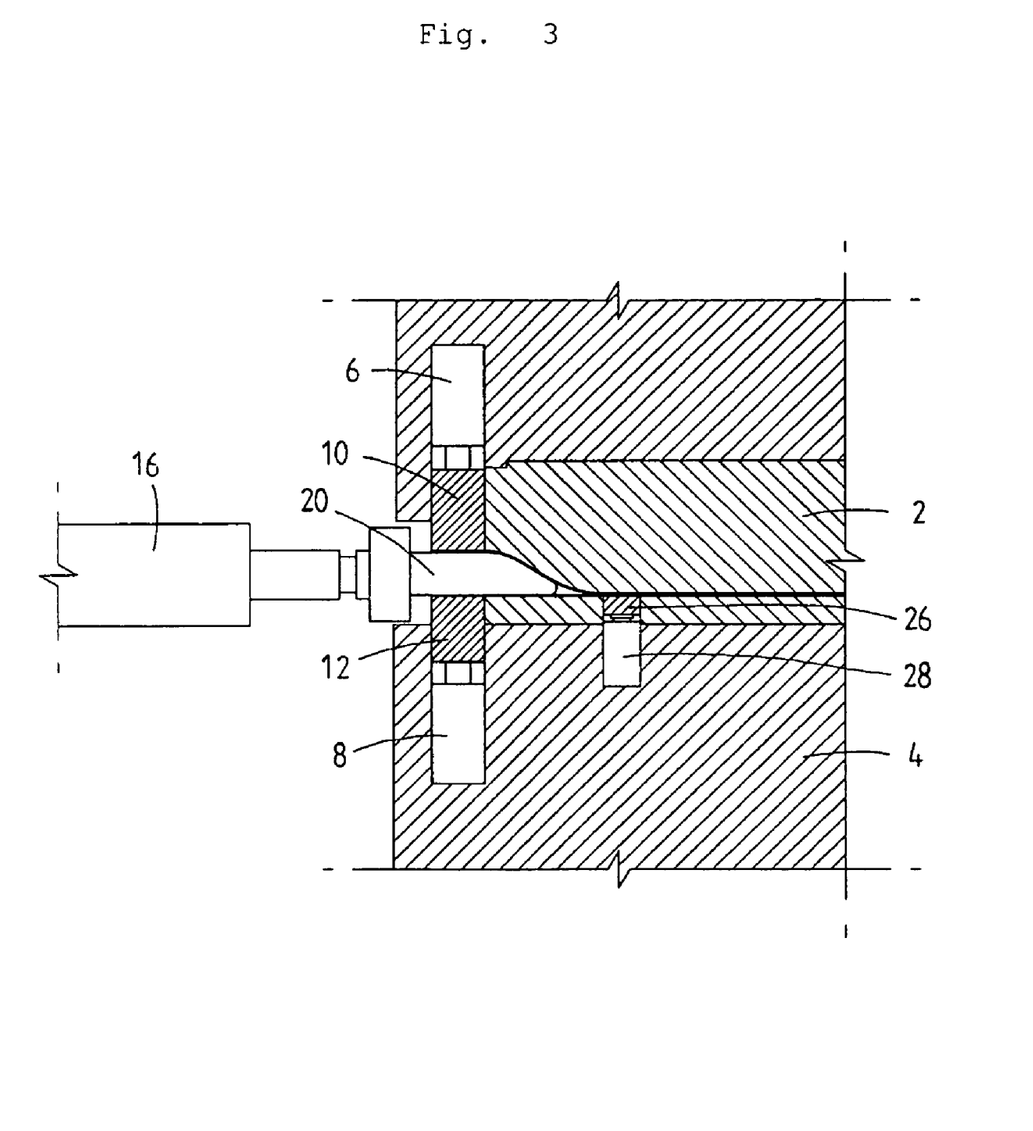
FIG. 3 is a partial transverse-sectional view illustrating the apparatus according to the present invention during the forming operation.
Figure 4:
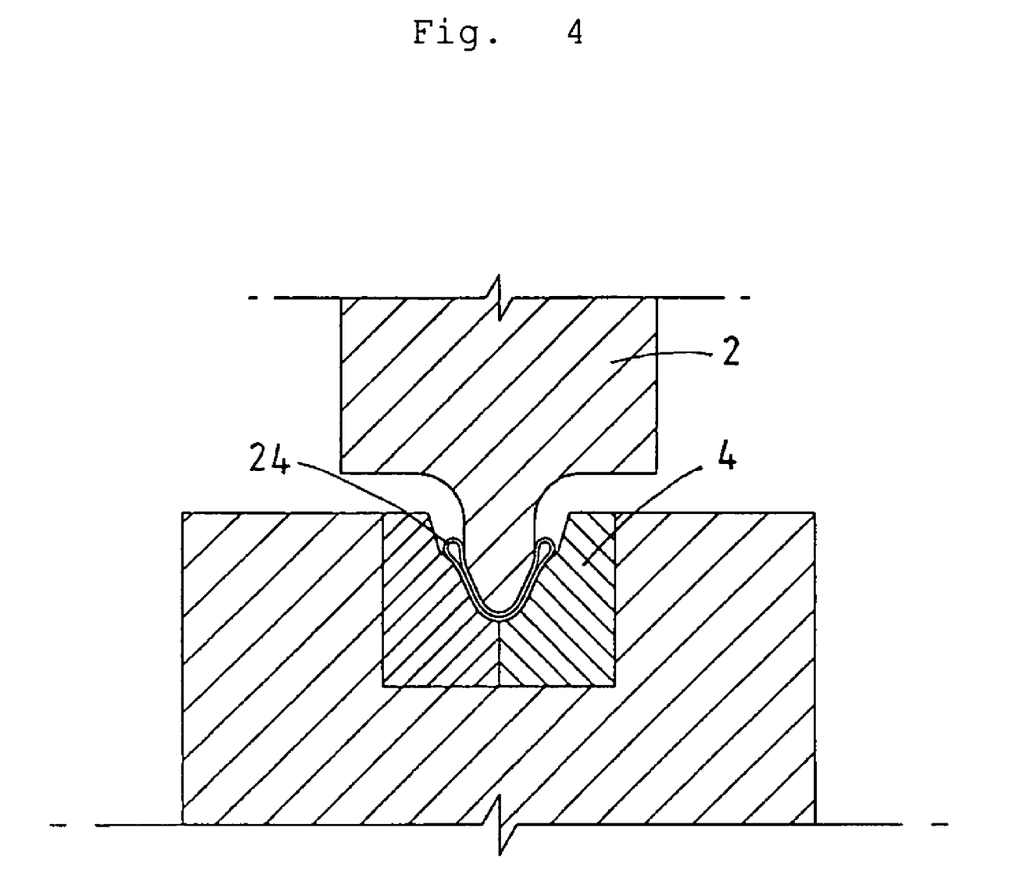
FIG. 4 is a partial cross-sectional view illustrating the apparatus according to the present invention during the forming operation.

FIG. 1 is a partial transverse-sectional view illustrating an apparatus according to the present invention before the forming operation, and FIG. 3 is a partial transverse-sectional view illustrating the apparatus of the invention upon forming operation. Referring to FIGS. 1 and 3, the apparatus of the present invention comprises top and bottom dies 2 and 4 mounted on a die frame connecting the top and bottom dies 2 and 4, upper and lower pad dies 10 and 12 coupled to top and bottom dies 2 and 4 to move up and down in the die frame by means of hydraulic cylinders 6 and 8, and left and right cams 20, which are horizontally inserted into a pipe 14 from both sides of the pipe 14 by a hydraulic cylinder 16.

The top and bottom dies 2 and 4 have lengths and shapes adapted to form a relatively long U-shaped or V-shaped section 24a at a central portion of a beam member 24, and to form an extension section 24c, respectively, in terms of cross-section of the beam member. The operation of the apparatus is performed in such a manner that the top die 2 moves vertically against the bottom die 4 fixed to the die frame.

Figure 5:
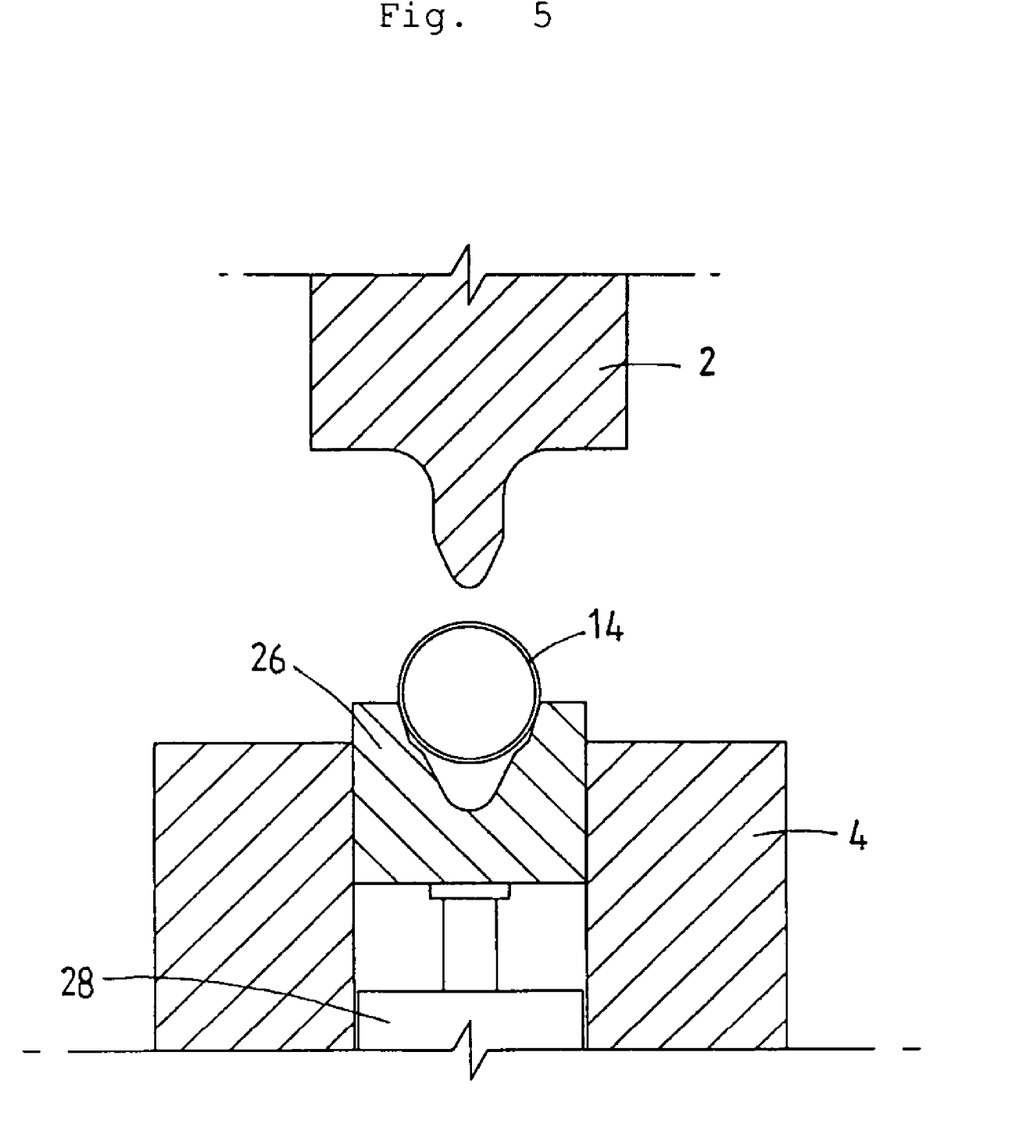
FIG. 5 is a partial cross-sectional view illustrating the apparatus according to the present invention during the operation of an ejector plate.

The bottom die 4 is provided with at least one ejector plate 26, which can be lifted from or lowered into the bottom die 4, such that the bottom die 4 and the ejector plate 26 constitute a complete shape corresponding to the top die 2. The ejector plate 26 is actuated by a hydraulic cylinder 28 to be raised from or lowered into the bottom die 4, and serves to abut the pipe 14 upon operation of forming a rectangular section 24b by means of the upper and lower pad dies 10 and 12 and to eject a completed beam member 24 from the bottom die 4.

The left and right cams 20 have shapes corresponding to inner shapes of the rectangular section 24b and the extension section 24c of the beam member 24, respectively, and are horizontally installed at positions, which allow the left and right cams 20 to be easily inserted into the pipe 14, before operation of the top and bottom dies 2 and 4.

When forming a completed beam member 24 with the apparatus of the invention, a pipe 14 is first fed onto a forming groove of the ejector plate 26 lifted from the bottom die 4, and then the upper and lower pad dies 10 and 12, the cams 20, and the top and bottom dies 2 and 4 are sequentially operated to form the completed beam member 24, the sequential operations of which can be performed by a simple control through an automatic controller as well as manual controller.

Figure 6:
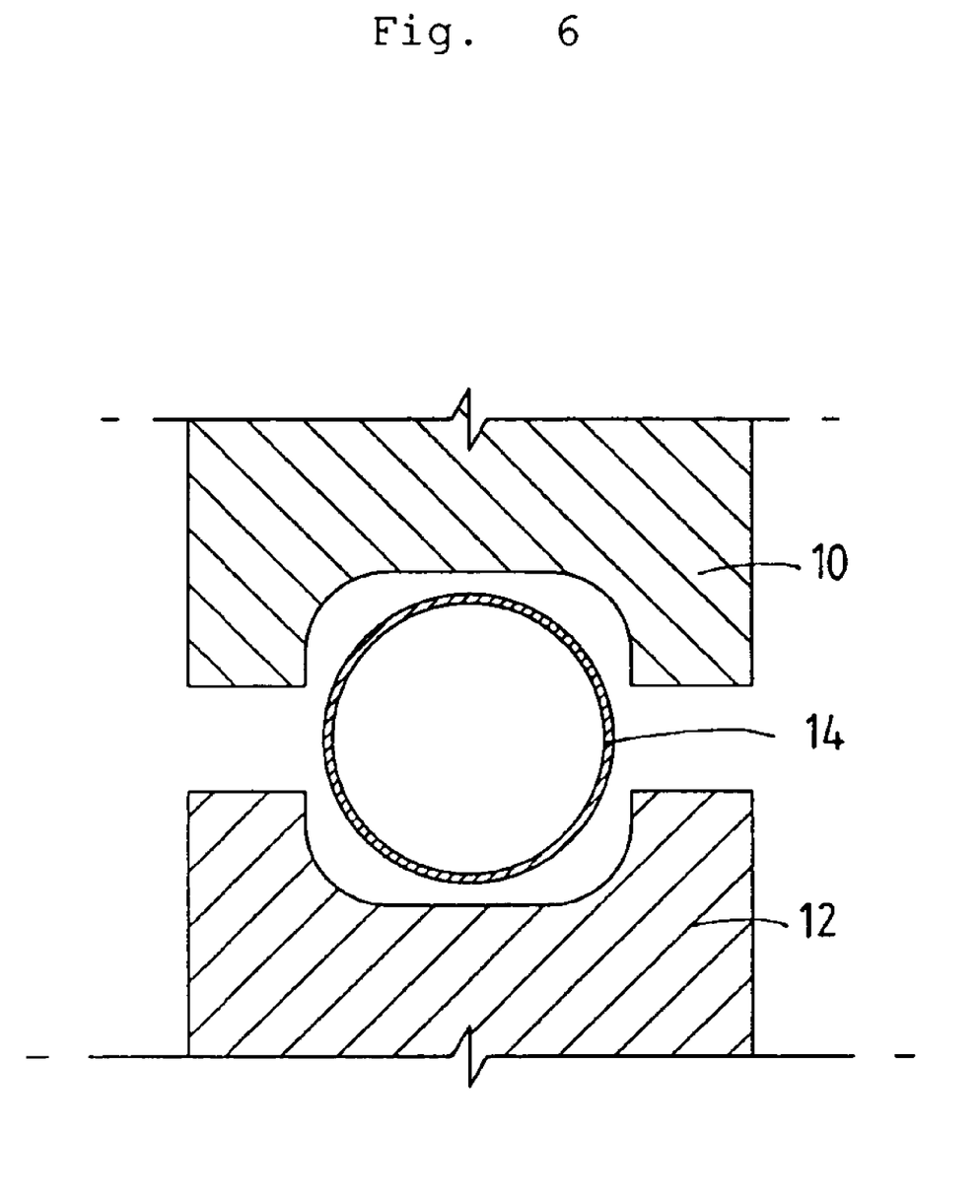
FIG. 6 is a partial cross-sectional view illustrating the apparatus according to the present invention before the operation of the die pad.
Figure 7:
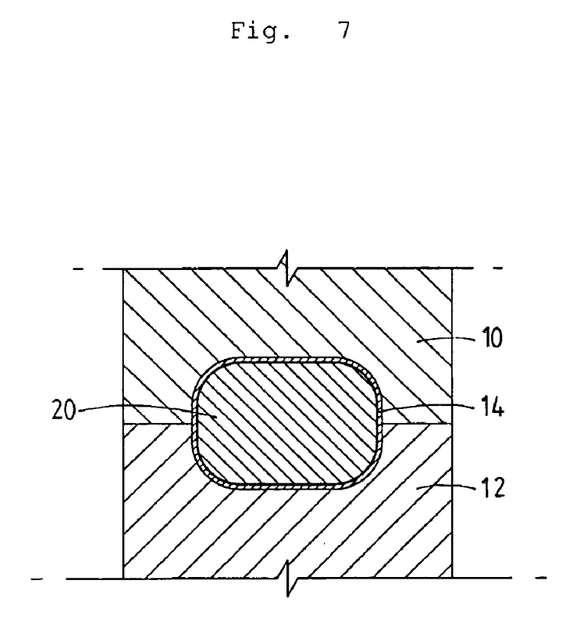
FIG. 7 is a partial cross-sectional view illustrating the apparatus according to the present invention during the operation of the die pad.
Figure 8:
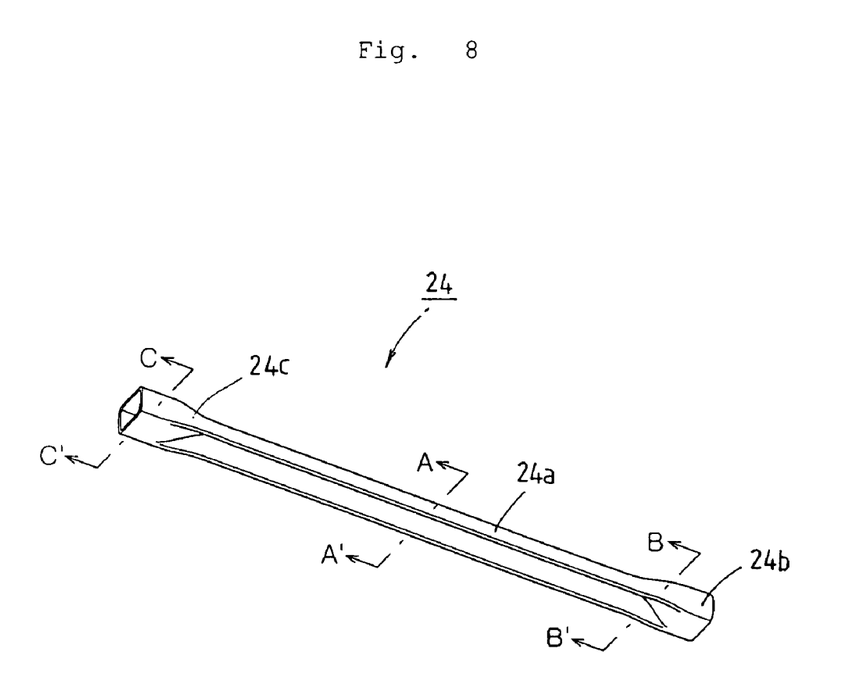
FIG. 8 is a tubular torsion beam formed by the apparatus of the present invention.
Figure 9:
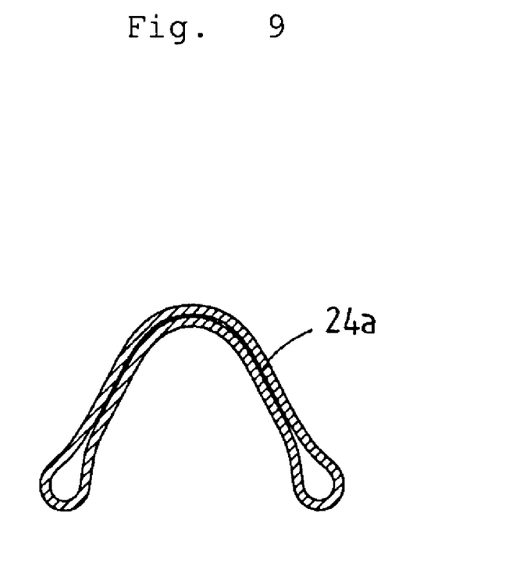
FIG. 9 is a cross-sectional view taken along line A-A' of FIG. 8.
Figure 10:
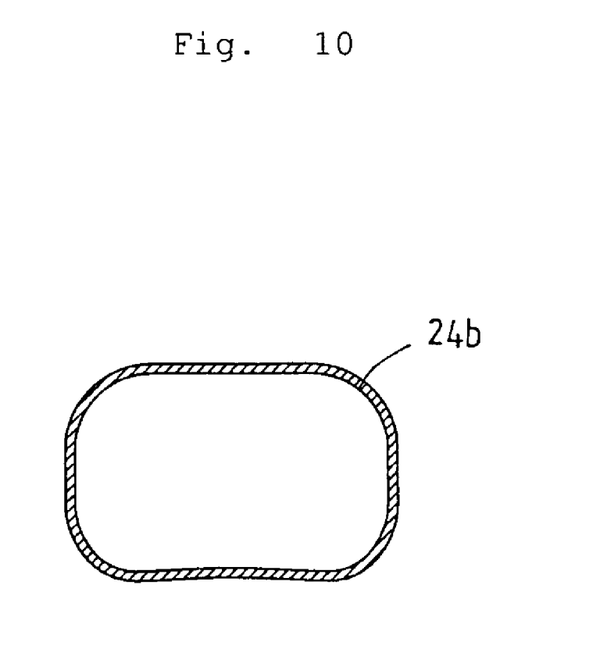
FIG. 10 is a cross-sectional view taken along line B-B' of FIG. 8.
Figure 11:
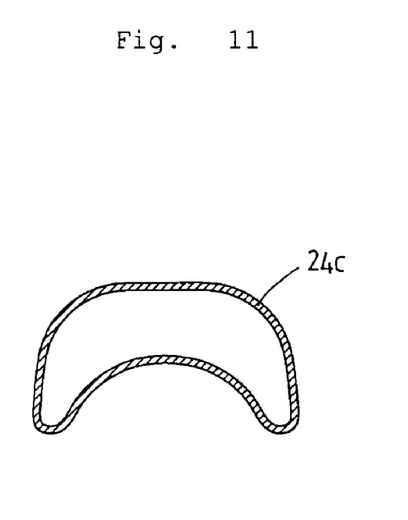
FIG. 11 is a cross-sectional view taken along line C-C' of FIG. 8.
Figure 12:
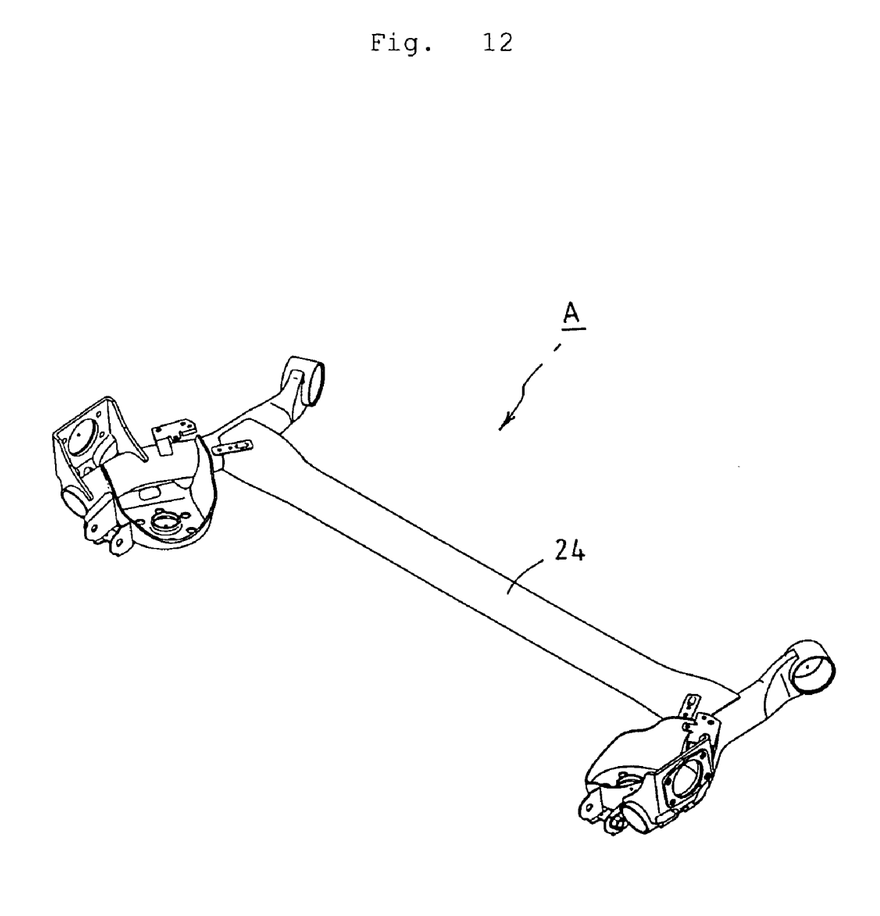
FIG. 12 is a perspective view of a torsion beam.

More specifically, the pipe 14 is pressed at both sides thereof by the upper and lower pad dies 10 and 12 actuated by the hydraulic cylinders 6 and 8 before being fed onto the ejector plate 26 lifted from the bottom die 4 and then rested on the bottom die 4, thereby forming the rectangular section 24b. Then, after the pipe 14 is rested on the bottom die 4 by lowering the ejector plate 26 into the bottom die 4 together with lowering the upper and lower pad dies 10 and 12, which currently compresses the pipe 14, the cams 20 are forwardly operated along the central line of the pipe 14 by the hydraulic cylinder 16, and inserted into the pipe 14 through the rectangular section 24b of the pipe 14.

The cams 20 residing inside the pipe 14 rigidly abut both sides of the pipe 14 together with the upper and lower pad dies 10 and 12, which compress the pipe 14. Then, the top die 2 is lowered, and presses the pipe 14 except for the rectangular sections 24b of the pipe 14, forming the U-shaped or V-shaped section 24a and the extension section 24c.

The top die 2 lowered onto the pipe 14 continues to compress the pipe 14 until the central portion of the pipe 14 is formed into the desired U-shaped or V-shaped section 24a through inner surface contact and bending of the pipe 14. During this process, the extension section 24c formed between the previously formed rectangular sections 24b and the U-shaped or V-shaped section 24a also suffers from rapid deformation due to external force applied thereto through the top and bottom dies 2 and 4. Further, as the top die 2 is maximally lowered for completion of forming, an inner surface of the extension section 24c comes into intimate contact with the cams 20 inserted into the extension section 24c, and is formed into a completely symmetrical shape with abutment of the cams 20 without distortion or winkling.

After completion of forming the beam member, withdrawals of the top die 2, the cams 20, and the upper and lower pad dies 10 and 12 are sequentially performed. Subsequently, the ejector plate 26 is lifted from the bottom die 4, and ejects the beam member 24 from the bottom die, thereby completing the operation of forming the beam member being completely symmetrical about the vertical axis of the beam member.

Although the apparatus of the invention has been described using an example of manufacturing the beam member, which can be used for the torsion beam of the rear wheel suspension system of the vehicle, it will be apparent to those skilled in the art that the present invention is not limited to this, and that the apparatus of the invention can be used for manufacturing any product having a compound cross-sectional structure.

As apparent from the description, the apparatus of invention can form the beam member used for the torsion beam in the rear wheel suspension system of the automobile to have different cross sections at different portions of the beam member while having complete symmetry between left and right sides of the beam member without generation of distortion or winkling by a single process, thereby reducing the number of components and processes, leading to an increase of productivity and price competitiveness of the products.

It should be understood that the embodiments and the accompanying drawings have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. An apparatus for forming a pipe into a beam member having multiple cross sections used for a torsion beam in a rear wheel suspension system of a vehicle, the apparatus comprising:

top and bottom opposing dies mounted to a die frame of the apparatus and relatively movable for forming the pipe into a beam member with a U-shaped or V-shaped cross section transverse to the beam length at a central portion of the beam member and having an extension section at ends of the beam member;

upper and lower pad-dies coupled to the top and bottom dies, respectively, to be independently operated in the die frame by a hydraulic cylinder for forming a rectangular section of the pipe into the beam member; and left and right cams installed at both sides of the pipe to be formed into said beam member, on a central line of the pipe, such cams being adapted to move horizontally into the ends of said pipe by means of a hydraulic cylinder for maintaining the inner shapes of the extension section and the rectangular section of the beam member while cooperating with the upper and lower pad dies.

2. The apparatus as set forth in claim 1, wherein the bottom die is provided with at least one ejector plate adapted to be lifted or lowered from the die frame by a hydraulic cylinder, such that the bottom die and the ejector plate constitute a complete shape corresponding to the top die.

* * * * *